June 5, 1928.
A. C. SAXTON
LOCK
Filed Nov. 22, 1920
1,672,284
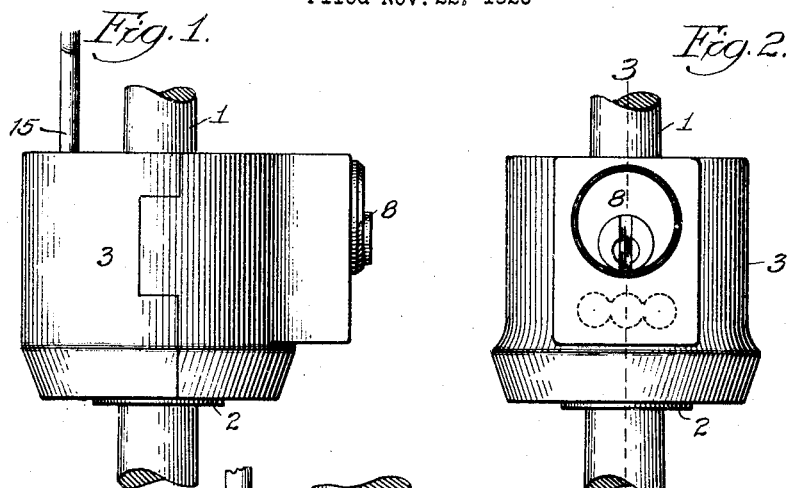
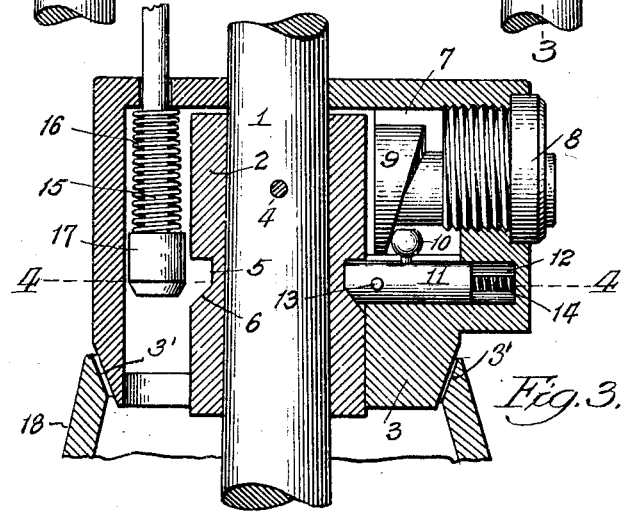
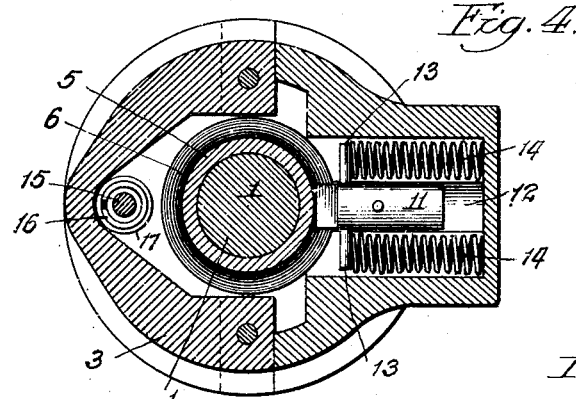
Witness:
John Enders
Inventor:
A. C. Saxton,
by Wallace R. Lane
Atty.

Patented June 5, 1928.

1,672,284

UNITED STATES PATENT OFFICE.

AUGUSTUS C. SAXTON, OF CHICAGO, ILLINOIS, ASSIGNOR TO H-R MANUFACTURING COMPANY, OF CHICAGO, ILLINOIS.

LOCK.

Application filed November 22, 1920. Serial No. 425,620.

This invention pertains more particularly to transmission lever locks for vehicles, though it may be useful in other situations.

The primary purpose of my invention is to make it less easy for a person to so injure such a lock that it will no longer serve to prevent unauthorized operation of the machine or other structure to which applied; and such further objects, advantages and capabilities as will later more fully appear.

My primary object is accomplished by providing a pair of sleeves, one receivable within the other, one of said sleeves being provided with a peripheral groove for the reception of a locking bolt carried by the other sleeve, the relation of the parts being such that the outer sleeve can be turned on the inner sleeve without injuring the parts. I also make one of the walls of the peripheral groove in the inner sleeve beveled or inclined, and the co-operating face of the locking plunger likewise beveled or inclined so that if the outer sleeve is forced farther on to the inner sleeve than intended there will not be any bending or springing of parts, because the locking bolt will ride up on the inclined face of the groove, and will be forced backwardly, whereas if the faces of both groove and plunger, or bolt, were at right angles and the outer sleeve were forced on farther than intended by the maker, there would be a tendency to bend the parts and thereby injure the lock.

My invention further resides in the combination, construction, and arrangement of parts illustrated in the accompanying drawings, and while I have shown therein a preferred embodiment, I desire the same to be understood as illustrative only and not as limiting my invention.

In the accompanying drawing illustrating my invention, Fig. 1 is a side elevation of a lock embodying said invention, said lock being shown applied to the transmission lever of an automobile; Fig. 2, is a view taken at a right angle to Fig. 1; Fig. 3, is a vertical section taken substantially along the plane indicated by line 3—3, Fig. 2; Fig. 4 is a transverse section taken substantially along the plane indicated by the line 4—4, Fig. 3.

Though my present invention is described in connection with a transmission lever, it is not to be understood that it is applicable only to such use. Applied to a transmission lever 1 are inner and outer sleeves 2 and 3, the former of which is secured in positon upon the transmission lever 1 by means of a pin or other suitable device 4. This outer sleeve 3 has its lower peripheral edge beveled as at 3′ to engage the upper beveled rim of the upper casing or plug 18 rigidly secured to the usual transmission casing, the construction of which is well known and therefore not illustrated. The inner sleeve is provided with a peripheral groove 5, one wall, 6, of which is inclined or beveled for a purpose to be referred to later. The outer sleeve 3 is hollow and adapted to slide on the transmission lever into a position surrounding the sleeve 2. Mounted in the transverse opening 7 in the sleeve 3 is a key controlled lock 8, provided with a cam member 9 adapted to engage an antifriction device 10 mounted upon locking bolt 11, which is slidable in an apetrure 12 in sleeve 3, in a direction transverse to the axis of the sleeve. Extending transversely through plunger 11 is a pin 13 the projecting ends of which are engaged by springs 14, mounted in sockets in the outer sleeve. These springs cause bolt 11 to be projected inwardly into the groove 5 in sleeve 2, when said bolt is free to move.

A head 17 on plunger 15 has resting against it one end of spring 16 which surrounds plunger 15 and has its other end resting against the inner side of the casing or sleeve 3. The upper end of plunger 15 is secured to lever 1 at such a point that sufficient tension will be placed on the spring, when sleeve 3 is pushed downwardly into locking positon, to cause the sleeve, when unlocked, to rise until entirely free from its co-operating locking member as is well understood.

It should be noted in passing that the locking bolt 11 or any equivalent structure may extend perpendicularly or tangentially to the fixed sleeve, the former being shown, because preferred. It will be seen from the drawing and the above description that when bolt 11 is seated in groove 5 the outer sleeve 3 may be turned by means of a wrench or otherwise without in any manner injuring the lock, which is what happens when the plunger extends into a depression in the transmission lever or a separate sleeve secured thereto, if said groove is not constructed to permit rotation as described. Injury of this kind sometimes happens when thieves attempt to remove a lock or render it inoperative to hold the part from operation, thus permitting them to drive and control the car. The beveled edge of the groove and bolt permits the outer sleeve to be forced on farther than intended without bending or springing any of the parts of the lock, since the end of the bolt would merely ride up on the inclined face of the groove thus shoving the bolt slightly back into its socket 12 until the bottom of sleeve 3 comes to a complete stop against casing 18. It is of course understood that the bolt can be used without a beveled face if desired, but the structure shown is preferred.

It is of course understood that the specific description of structure set forth above may be departed from without departing from the spirit of my invention as set forth in this specification, and the appended claims.

Having now described my invention, I claim:

1. In a transmission locking mechanism, a transmission lever, a transmission casing surrounding said lever, a sleeve fixed to said lever and provided in its external face with a transverse peripheral groove, a slidable sleeve surrounding the fixed sleeve and the lever, and co-operating with the transmission casing to hold the lever against actuation, said slidable sleeve having a locking member and said locking member and groove being constructed and arranged to cause the recession of said locking member on abnormal sliding movement of said slidable sleeve toward said casing.

2. In a transmission lock, a transmission casing having an open beveled mouth, a transmission lever movably mounted within said casing, a sleeve having a peripheral groove therein fixed to said lever, the upper face of said groove being approximately perpendicular to the axis of the sleeve and the lower face of said groove being inclined downwardly, a second sleeve slidable longitudinally of the first sleeve, said second sleeve having a lower beveled edge adapted to contact the beveled mouth of said casing, said second sleeve carrying a locking bolt provided with an inclined face to cooperate with the inclined face of the groove whereby the second sleeve is permitted to advance on the first sleeve beyond normal locking position without injury to any of the lock parts.

3. In an article of the class described, in combination with a casing surrounding a transmission lever and provided with an open beveled mouth, an inner sleeve adapted to be rigidly secured to the lever, an outer sleeve surrounding and slidable along the lever and adapted to surround the inner sleeve and having a lower open end, the peripheral edge of which is beveled and adapted to contact the open mouth of said casing, said inner sleeve being provided with a peripheral depression, and a key-controlled locking bolt mounted in the slidable sleeve and adapted to engage the peripheral depression, an upper wall of said depression being perpendicular to said lever and a lower wall of said depression sloping obliquely to said lever, said bolt having an upper wall disposed in a plane parallel to the upper wall of the depression and a lower surface disposed parallel to the sloping wall of the depression.

In witness whereof, I hereunto subscribe my name to this specification.

AUGUSTUS C. SAXTON.